US012530528B2

(12) United States Patent
Jiao et al.

(10) Patent No.: US 12,530,528 B2
(45) Date of Patent: Jan. 20, 2026

(54) GENERATION OF DATA MODELS FOR PREDICTING DATA

(71) Applicant: Microsoft Technology Licensing, LLC, Redmond, WA (US)

(72) Inventors: Jian Jiao, Bellevue, WA (US); Yeyun Gong, Beijing (CN); Nan Duan, Beijing (CN); Weizhu Chen, Bellevue, WA (US); Kewen Tang, Bellevue, WA (US); Qiang Lou, Bellevue, WA (US); Ruofei Zhang, Sunnyvale, CA (US); Yu Yan, Bellevue, WA (US); Jiusheng Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 18/268,699

(22) PCT Filed: Dec. 25, 2020

(86) PCT No.: PCT/CN2020/139498
§ 371 (c)(1),
(2) Date: Jun. 21, 2023

(87) PCT Pub. No.: WO2022/134021
PCT Pub. Date: Jun. 30, 2022

(65) Prior Publication Data
US 2024/0046037 A1 Feb. 8, 2024

(51) Int. Cl.
*G06F 40/284* (2020.01)
*G06F 40/40* (2020.01)
(52) U.S. Cl.
CPC ............ *G06F 40/284* (2020.01); *G06F 40/40* (2020.01)

(58) Field of Classification Search
None
See application file for complete search history.

(56) References Cited

U.S. PATENT DOCUMENTS

| 2014/0350931 | A1  | 11/2014 | Levit |
| 2019/0130249 | A1* | 5/2019  | Bradbury ............... G06N 3/084 |
| 2022/0139384 | A1* | 5/2022  | Wu ........................ G06F 40/35 |
|              |     |         | 704/257 |

FOREIGN PATENT DOCUMENTS

| CN | 109858046 A | 6/2019 |
| CN | 111581988 A | 8/2020 |

(Continued)

OTHER PUBLICATIONS

Qi, Weizhen, et al. "Bang: Bridging autoregressive and non-autoregressive generation with large scale pretraining." International Conference on Machine Learning. PMLR, 2021. (Year: 2021).*

(Continued)

*Primary Examiner* — Douglas Godbold
(74) *Attorney, Agent, or Firm* — Shook, Hardy & Bacon L.L.P.

(57) ABSTRACT

Systems and methods are provided for training a data model based on training data. The training includes pre-training and fine-tuning the data model based on a combination of an autoregressive (AR) model and a non-autoregressive (NAR) model. Training data may be received and encoded into streams of tokens. A pre-trainer during decoding generates a continuum of data structures of the AR and NAR combined model including a main stream and a series of predicting streams. Masked tokens in predicting streams reference or attend to one or more preceding tokens in the main stream or the preceding predicting streams. A fine-tuner selects streams to generate a trained model according to a target data model. The target data model is determined based on (Continued)

balancing an accuracy constraint and an efficiency constraint for predicting tokens. The decoder acts as abridge between the AR and NAR models in generating a trained data model.

20 Claims, 10 Drawing Sheets

(56) References Cited

FOREIGN PATENT DOCUMENTS

| CN | 111709248 A | 9/2020 |
|---|---|---|
| CN | 111797589 A | 10/2020 |
| CN | 112052692 A | 12/2020 |
| CN | 110245359 A | 1/2024 |

OTHER PUBLICATIONS

Barezi, Elham J., et al. "A study on the autoregressive and non-autoregressive multi-label learning." arXiv preprint arXiv:2012.01711 (2020). (Year: 2020).*
Zhou, Long, Jiajun Zhang, and Chengqing Zong. "Improving Autoregressive NMT with Non-Autoregressive Model." Proceedings of the First Workshop on Automatic Simultaneous Translation. 2020. (Year: 2020).*
Office Action Received for Chinese Application No. 202080107781.8, mailed on Oct. 8, 2024, 06 pages (English Translation Provided).
Sun, et al., "An EM Approach to Non-autoregressive Conditional Sequence Generation" arXiv:2006.16378v1, Jun. 29, 2020, 18 Pages.
Bahdanau, et al., "Neural Machine Translation by Jointly Learning to Align and Translate", In Repository of arXiv:1409.0473v1, Sep. 1, 2014, pp. 1-15.
Dong, et al., "Unified Language Model Pre-training for Natural Language Understanding and Generation", In Proceedings of the 33rd Conference on Neural Information Processing Systems, May 8, 2019, 13 Pages.
Du, et al., "Learning to Ask: Neural Question Generation for Reading Comprehension", In Proceedings of the 55th Annual Meeting of the Association for Computational Linguistics, Jul. 30, 2017, pp. 1342-1352.
Ghazvininejad, et al., "Mask-Predict: Parallel Decoding of Conditional Masked Language Models", In Repository of arXiv:1904.09324v2, Sep. 4, 2019, 10 Pages.
Graff, et al., "English Gigaword", In Linguistic Data Consortium, Jan. 28, 2003, 2 Pages.
Gu, et al., "Levenshtein Transformer", In Proceedings of the 33rd Conference on Neural Information Processing Systems, May 27, 2019, 11 Pages.
Gu, et al., "Non-Autoregressive Neural Machine Translation", In Repository of arXiv:1711.02281v1, Nov. 7, 2017, 13 Pages.
Guo, et al., "Fine-Tuning by Curriculum Learning for Non-Autoregressive Neural Machine Translation", In Repository of arXiv:1911.08717v1, Nov. 20, 2019, 8 Pages.
Hermann, et al., "Teaching Machines to Read and Comprehend", In Proceedings of the 28th International Conference on Neural Information Processing Systems, 2015, pp. 1-9.
Lee, et al., "Deterministic Non-Autoregressive Neural Sequence Modeling by Iterative Refinement", In Repository of arXiv:1802.06901v1, Feb. 19, 2018, 10 Pages.
Lewis, et al., "BART: Denoising Sequence-to-Sequence Pre-training for Natural Language Generation, Translation, and Comprehension", In Repository of arXiv:1910.13461, Oct. 29, 2019, 10 pages.
Liang, et al., "Xglue: A New Benchmark Dataset for Cross-lingual Pre-training, Understanding and Generation", In Repository of arXiv:2004.01401v3, May 22, 2020, 11 Pages.
Narayan, et al., "Don't Give Me the Details, Just the Summary! Topic-Aware Convolutional Neural Networks for Extreme Summarization", In Proceedings of the Conference on Empirical Methods in Natural Language Processing, Oct. 31, 2018, pp. 1797-1807.
"International Search Report and Written Opinion Issued in PCT Application No. PCT/CN20/139498", Mailed Date: Sep. 26, 2021, 9 Pages.
Raffel, et al., "Exploring the Limits of Transfer Learning with a Unified Text-to-Text Transformer", In Journal of Machine Learning Research, vol. 21, Issue 1, Jan. 1, 2020, 67 Pages.
Rajpurkar, et al., "SQuAD: 100,000+ Questions for Machine Comprehension of Text", In Proceedings of the Conference on Empirical Methods in Natural Language Processing, Nov. 1, 2016, pp. 2383-2392.
Reddy, et al., "CoQA: A Conversational Question Answering Challenge", In Transactions of the Association for Computational Linguistics, vol. 7, May 1, 2019, pp. 1-18.
Ren, et al., "A Study of Non-autoregressive Model for Sequence Generation", In Repository of arXiv:2004.10454v1, Apr. 22, 2020, 11 Pages.
Rush, et al., "A Neural Attention Model for Abstractive Sentence Summarization", In Proceedings of the Conference on Empirical Methods in Natural Language Processing, Sep. 2015, pp. 379-389.
See, et al., "Get To The Point: Summarization with Pointer-Generator Networks", In Proceedings of the 55th Annual Meeting of the Association for Computational Linguistics, Jul. 30, 2017, pp. 1073-1083.
Song, et al., "MASS: Masked Sequence to Sequence Pre-training for Language Generation", In Repository of arXiv:1905.02450v1, May 7, 2019, 11 Pages.
Vaswani, et al., "Attention Is All You Need", In Proceedings of the 31st Conference on Neural Information Processing Systems, Jun. 2017, 11 Pages.
Wang, et al., "Semi-Autoregressive Neural Machine Translation", In Repository of arXiv:1808.08583v2, Oct. 27, 2018, 10 Pages.
Yan, et al., "ProphetNet: Predicting Future N-gram for Sequence-to-Sequence Pre-training", In Repository of arXiv:2001.04063v1, Jan. 13, 2020, 10 Pages.
Zhang, et al., "PEGASUS: Pre-training with Extracted Gap-sentences for Abstractive Summarization", In Repository of arXiv:1912.08777v1, Dec. 18, 2019, 52 Pages.
Zhao, et al., "Paragraph-level Neural Question Generation with Maxout Pointer and Gated Self-attention Networks", In Proceedings of the Conference on Empirical Methods in Natural Language Processing, Oct. 31, 2018, pp. 3901-3910.
Extended European Search Report received for EP Application No. 20966586.8, mailed on Jul. 29, 2024, 06 Pages.
Communication pursuant to Rules 70(2) and 70a (2) Received in European patent application No. 20966586.8 mailed on Aug. 16, 2024, 1 page.
Notice of Grant for Chinese Application No. 202080107781.8, mailed on Feb. 24, 2025, 4 pages. (English Translation Provided).
Yu et al., "Prophetnet: Predicting future n-gram for sequence-to-sequence pre-training", In Repository of arXiv:2001.04063v2, Jan. 2020, 12 Pages.

\* cited by examiner

GENERATION OF DATA MODELS FOR PREDICTING DATA

CROSS-REFERENCE TO RELATED APPLICATION

This application is the U.S. national phase of the International Patent Application PCT/CN2020/139498, filed Dec. 25, 2020, the entire content of which is incorporated herein by reference.

BACKGROUND

Traditional systems predict and generate data, e.g., keywords from a query, using a method based on sequence-to-sequence models. These systems generate or predict each token, e.g., an encoded form of a word in a query sentence, conditioned on previously generated tokens in autoregressive (AR) models. The AR generation models generate output based on previously generated output and the process repeats multiple times depending on the length of the generated sentence. While the AR models may provide accuracy in predicting words, these models are processing intensive and may cause high latency, which may become unacceptably long when processing high volumes of data (e.g., during a web search by a search engine). In contrast, a non-autoregressive (NAR) models generate all tokens in parallel, resulting in higher token generation efficiency. However, the NAR model is less accurate in predicting the tokens than an AR models. In practice, there are trade-offs between deploying the AR models or the NAR models depending on system requirements or capabilities, deployment costs, latency requirements, accuracy requirements, and the like. Thus, developing a technology that better meets these requirements while minimizing trade-offs would be desirable.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by providing pre-trained streams that combine the AR models and NAR models for sequence-to-sequence generation.

The present disclosure relates to generating language generation models based on a pre-training and fine-tuning process. In particular, the pre-training process generates a main stream and one or more predicting streams for each token of a target sentence. The resulting set of predicting streams for the target sentence represents a superset of data used for fine-tuning to generate a range of various combinations of the AR and NAR models for deployment in different scenarios. The fine-tuning process then generates a trained model by selecting streams from the main stream and the predicting streams to build a structure that combines features of the AR and NAR models. The streams selected to build the trained model are based on balancing efficiency and accuracy demands for a particular language processing scenario. A particular trained model may be defined based on a predetermined number of tokens to be processed using the AR model and the rest of the tokens by the NAR model. The particular combination of the AR and NAR models may be selected based on balancing real-time efficiency and accuracy requirements. The disclosed technology enables partially generating a target sequence using an AR model (e.g., the first two words of a sentence predicted based on the AR model) and generating the remainder of tokens or words of the target sequence using the NAR model. This way, predicting tokens or words that require more accuracy (e.g., initial tokens) use more resources than processing remaining words (e.g., subsequent words) of the target sentence. Accuracy of predicting the whole sentence improves by correctly generating the first few tokens while efficiency improves by generating the rest of the tokens in parallel based on the NAR model.

The disclosed technology includes an encoding process and a decoding process for generating the trained model. The decoding process will be the primary focus of the present disclosure. The decoding process includes a pre-training sub-process and a fine-tuning process. The pre-training sub-process includes a self-attention mechanism based on an n-stream structure to model different iterative combinations of the AR and NAR models. In the fine-tuning sub-process, the present technology enables generating a trained model based on an optimal combination of the AR and NAR models, e.g., by selecting from among a continuum of combinations of the AR and NAR models to strike a balance between token accuracy and processing efficiency.

Some examples include a method for generating a data model, a language generation model, for example. The method may include receiving training data, generating, based on the training data, a main stream, wherein the main stream represents a stream of tokens, and wherein each token represents a value associated with the training data, generating, a series of predicting streams based on the main stream, wherein each predicting stream includes one or more masked tokens corresponding to one or more token positions in the stream of tokens, based on a target data model, selecting a first set of streams for predicting tokens according to a first processing model, wherein the first set of streams is selected from the main stream and the series of predicting streams, based on the target data model, selecting a second set of streams for predicting tokens according to a second processing model, wherein the second set of streams is selected from the series of predicting streams, and generating, using the selected first set of streams and second set of streams, a trained data model corresponding to the target data model for predicting tokens in accordance with an accuracy constraint and an efficiency constraint during deployment. By generating the trained data model corresponding to the target data model for predicting tokens, one can generate the trained data model that satisfy requirements associated with the efficiency constraint and the accuracy constraint in the deployed system environment. The first processing model may be associated with an autoregressive (AR) model, and wherein the second processing model is associated with a non-autoregressive (NAR) model. The target data model may specify a number of tokens to be processed based on the first processing model and remaining tokens to be processed based on the second processing model. A second stream of the second set of streams may reference a predicted value of a token in a first stream of the second set of streams. The second set of streams may be processed in parallel according to the second processing model. A second stream of the first set of streams may reference a value of a token in a first stream of the first set of streams. The first stream may be the main stream. The method may further comprise determining the target data model based on balancing the accuracy constraint and the efficiency constraint for predicting tokens. The method may further comprise receiving a query, generating, based on the received query, a set of queries using the trained data model, retrieving, based on the set of queries, one or more keywords, generating a set of keywords by matching the one or more retrieved keywords with at least one known keyword in a keyword corpus, and providing the set of generated keywords.

Some examples include a system for training a data model. The system comprises a processor and a memory storing computer-executable instructions that when executed by the processor cause the system to: receive training data, generate, based on the training data, a main stream, wherein the main stream represents a stream of tokens, and wherein each token represents a value associated with the training data, generate, a series of predicting streams based on the main stream, wherein each predicting stream includes one or more masked tokens corresponding to one or more token positions in the stream of tokens, based on a target data model, select a first set of streams for predicting tokens according to a first processing model, wherein the first set of streams is selected from the main stream and the series of predicting streams, based on the target data model, select a second set of streams for predicting tokens according to a second processing model, wherein the second set of streams is selected from the series of predicting streams, and generate, using the selected first set of streams and second set of streams, a trained data model corresponding to the target data model for predicting tokens in accordance with an accuracy constraint and an efficiency constraint during deployment. By generating the trained data model corresponding to the target data model for predicting tokens, one can generate the trained data model that satisfy requirements associated with the efficiency constraint and the accuracy constraint in the deployed system environment. The first processing model may be associated with an autoregressive (AR) model, and wherein the second processing model is associated with a non-autoregressive (NAR) model. The target data model may specify a number of tokens to be processed based on the first processing model and remaining tokens to be processed based on the second processing model. A second stream of the second set of streams may reference a predicted value of a token in a first stream of the second set of streams. The second set of streams may be processed in parallel according to the second processing model. A second stream of the first set of streams may reference a value of a token in a first stream of the first set of streams. The first stream may be the main stream. The computer-executable instructions when executed further causing the system to determine the target data model based on balancing the accuracy constraint and the efficiency constraint for predicting tokens.

Some examples include a computer-readable non-transitory recording medium storing computer-executable instructions that when executed by a processor cause a computer system to receive training data, generate, based on the training data, a main stream, wherein the main stream represents a stream of tokens, and wherein each token represents a value associated with the training data, generate, a series of predicting streams based on the main stream, wherein each predicting stream includes one or more masked tokens corresponding to one or more token positions in the stream of tokens, based on a target data model, select a first set of streams for predicting tokens according to a first processing model, wherein the first set of streams is selected from the main stream and the series of predicting streams, based on the target data model, select a second set of streams for predicting tokens according to a second processing model, wherein the second set of streams is selected from the series of predicting streams, and generate, using the selected first set of streams and second set of streams, a trained data model corresponding to the target data model for predicting tokens in accordance with an accuracy constraint and an efficiency constraint during deployment.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
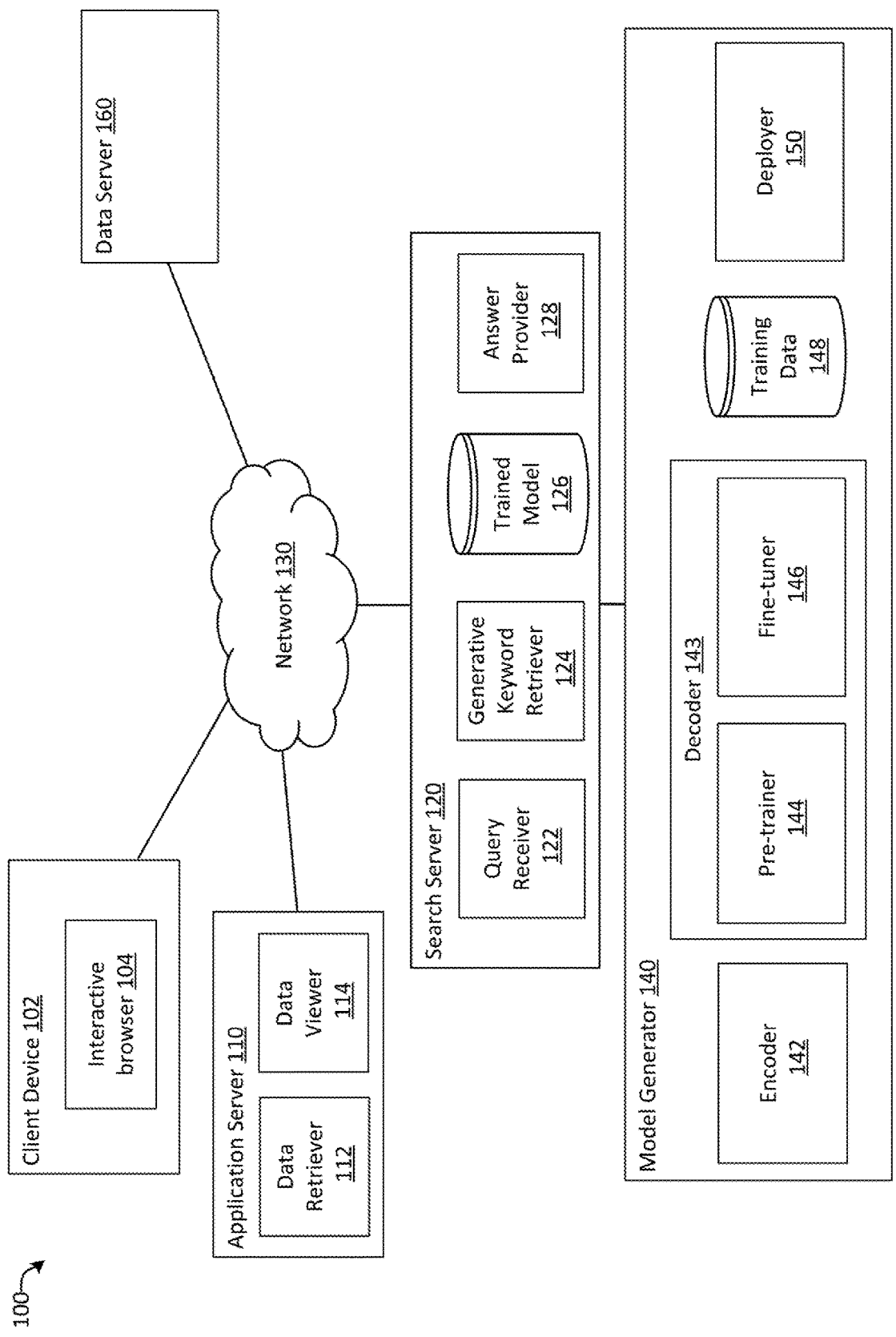
FIG. 1 illustrates an overview of an example system for generating a trained model and deploying into an application service in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Natural language processing relies on predicting missing data in a given set of data for various purposes, including language translations, summarizing texts, information retrieval, image recognition, and the like. Currently, there are two distinct models for automatically generating natural language data. Autoregressive (AR) generation models predict an output (e.g., a token) based on previously generated output (e.g., prior tokens) and repeats this process multiple times depending on a length of a target sentence being predicted or generated. The AR generation model produces high-quality (e.g., highly accurate) predictive results. However, issues arise in efficiently predicting the target sentence because the AR generation model is processing intensive and suffers from high latency. The latency may become unacceptably long when processing a large training corpus in a real-time processing environment. In contrast, a non-autoregressive (NAR) model processes all tokens in parallel. The NAR generation model uses one or more masks and connections between the masks in a target sentence to predict respective tokens or words of the target sentence. Since the NAR model processes all tokens in parallel, it does not benefit from previously predicted data. Thus, predicting a target sentence based on the NAR generation models may be more efficient but less accurate than the predicting based on the AR generation models. The present application solves this trade-off issue by providing a system that is efficiently tunable to train language models based on combining aspects of both the AR generation models and the NAR generation models. The present application enables balancing competing demands of accuracy and efficiency to generate a trained model customized for a particular processing scenario.

As discussed in more detail below, the present disclosure relates to a language generation model for producing a trained model that improves efficiency without substantially impacting accuracy. In particular, the language generation model selectively uses combinations of the AR and NAR generation models to balance efficiency and accuracy of natural language processing based on specific system resources, accuracy demands, latency requirements, and the like. The disclosed technology addresses the problem by generating, through a pre-training process, a set of predicting streams of data that may be used to generate a continuum of combinations of the AR and NAR generation models for fine-tuning a trained model based on real-time requirements.

FIG. 1 illustrates an overview of an example system 100 for generating and using a language model in accordance with aspects of the present disclosure. System 100 represents a system for using a language generation model (or models) to generate a trained model using a trainer and production servers. System 100 includes a client device 102, an application server 110, a data server 120, a model generator 140, and a network 130. The client device 102 communicates with the application server 110, which includes one or more sets of instructions to execute as applications on the client device 102. The application server 110 includes a data retriever 112 and a data viewer 114. The one or more sets of instructions in the application server 110 may provide an interactive user interface through an interactive browser 104. The search server 120 includes a query receiver 122, a generative keyword retriever 124, a trained model 126, and an answer provider 128. The network 130 provides network connectivity among the client device 102, the application server 110, and the search server 120. The model generator 140 includes the encoder 142, the decoder 143, training data 148, and the deployer 150. The decoder 143 includes the pre-trainer 144 and the fine-tuner 146. The Data Server 160 stores and serves data to the search server 120 and the application server 110 over the network 130.

The client device 102 connects with the application server 110 via the network 130 to execute applications that include user interactions through the interactive browser 104. The application server 110 interacts with the client device 102 and the search server 120 via the network 130 to perform the information search and retrieval. The model generator 140 generates trained language models (or other trained models for predicting other types of missing data, e.g., pixel data) according to the present disclosure. In aspects, the model generator 140 may generate trained language models that are based on a combination of the AR and NAR models.

The client device 102 is a general computer device providing user-input capabilities e.g., via interactive browser 104 for searching for information over the network 130. In some aspects, the client device 102 optionally receives user input from a system developer for striking a desirable balance between efficiency and accuracy based on a number of tokens to be processed by an AR model and an NAR model in a resulting trained language model. The interactive browser 104 may render a graphical user interface associated with a web browser, for example. In aspects, the client device 102 may communicate over the network 130 with the application server 110.

The application server 110 is a server that enables a user (who may search for information based on a deployed trained model) and a developer (who may use the model generator 140 to generate the trained model for deployment) to interactively use the system 100 on the client device 102. The application server 110 may comprise applications including the data retriever 112 and the data viewer 114. The data viewer 112 may provide a rendering of data for viewing by the user. The data retriever 114 may be used to query and receive data by communicating with the search server 120, for example.

In aspects, the data retriever 112 may connect with the query receiver 122 of the search server 120 to query information. The generative keyword retriever 124 may perform generative retrieval of keywords based on the received query by expanding the query and retrieving data from the data server 160. The trained model 126 (e.g., a trained language generation model) may perform the expansion of the received query into a set of queries by predicting words of the queries based on the receive query. The answer provider 128 may provide answers (e.g., results) to the query to the data retriever 112 on the interactive browser 104 in the client device 102. The data viewer 114 may receive the results to the query for viewing by the user using the interactive browser 104 on the client device 102.

The model generator 140 represents the applications/systems used for generating a language generation model and training the language generation model for deployment as the trained model 126 in the search server 120. In embodiments, the model generator 140 includes the encoder 142, the decoder 143, the training data 148, and the deployer 150. The decoder 143 may further include the pre-trainer 144 and the fine-tuner 146. The encoder 142 encodes the training data 148. The pre-trainer 144 uses the encoded training data to pre-train and generate a main stream and a set of predicting streams as a superset of data for fine-tuning. The fine-tuner 146 selects the main stream and one or more predicting streams to generate a trained model that is a combination of the AR and NAR models as specified by a developer. When a hybrid AR-NAR is selected for processing all tokens (described further below), the fine-tuner 146 does not select the main stream but rather selects all of the predicting streams to generate the trained model. The training data 148 includes a corpus of sentences for training the model. In aspects, the training data 148 includes at least one text sentence which includes a set of words (or tokens). In some other aspects, the training data 148 includes a corpus of images for training the model. The corpus of training data for images may include pixel data for the images. The deployer 150 deploys the fine-tuned (i.e., trained) model to the Search Server 120 as trained model 126.

In embodiments, the model generator 140 generates a trained model for deployment (where the trained model may include a trained language model, a trained image model, and the like). The generation process includes an encoding process and a decoding process. The encoder 142 receives training data (e.g., at least one text sentence) and encodes the text sentence into encoded tokens. A multi-dimensional vector may represent each encoded token. A set of encoded tokens of a target sentence for training may be in a form of a main stream. The pre-trainer 144 generates a set of predicting streams using the main stream based on a self-attention model. In aspects, the self-attention model according to the present disclosure allows for "paying attention to" not only the current token itself but also other tokens that precede the current token in the target sentence. That is, predicted results for prior tokens are used to predict the current token by analyzing how the current token relates to each of the preceding tokens in the target sentence.

The decoder includes the pre-trainer for a pre-training process and the fine-tuner for a fine-tuning process respectively. The pre-training process (e.g., performed by the pre-trainer 144) receives encoded tokens of training sentences and generates a main stream and a set of predicting streams for predicting tokens of a target sentence. The set of predicting streams represents a superset of data for generating different combinations of the AR and NAR models customized for different accuracy and efficiency requirements. In a traditional decoder for AR language generation models, "teacher-forcing" is a commonly used term to describe use of previously predicted tokens as context input to predict the current token. In aspects, teacher-forcing may include comparing a prediction answer with a correct answer, correcting the prediction answer with the correct answer if the prediction answer is incorrect, and using the correct answer for predicting subsequent tokens or words in a sentence. The main stream includes a stream of tokens. In some aspects, the pre-trainer 144 generates the main stream based on the "teacher-forcing." In a traditional decoder for NAR language generation models, several different initialization methods are popular, such as encoder copy, [MASK] (M) initialization, and posterior distribution approximation. For NAR language generation models, length prediction may determine a number of masked tokens to feed.

The fine-tuning process (e.g., performed by the fine-tuner 146) uses the main stream and the complete set of predicting streams to generate a trained model customized for a particular processing scenario. This is done by selecting a subset of streams that combine aspects of AR and NAR models to meet the efficiency/accuracy requirements of the particular scenario. To balance the accuracy and efficiency demands, the combination may involve selecting a number of tokens in the target sentence to be predicted based on an AR model and a remainder of the tokens to be predicted based on an NAR model. The subset of streams, then, are selected from the superset for processing the number of initial tokens based on AR and the remaining tokens based on NAR. Predictions based on the AR model provide higher accuracy than the predictions based on the NAR model. However, predictions based on the AR model are processed less efficiently than predictions based on the NAR model. The combination, however, enables initial tokens to be predicted more accurately using AR and, based on using the initial predictions as context, subsequent tokens are predicted both more accurately and efficiently using an NAR model. The pre-trainer generates a series of predicting streams based on the main stream. Each predicting stream includes one or more masked tokens corresponding to one or more token positions in the stream of tokens in the predicting stream. In some examples, each predicting stream of the superset of predicting streams references one or more token predictions of previous streams. In this case, unlike traditional NAR models, the disclosed model may be referred to as a "hybrid AR-NAR model" because it incorporates backward looking context (e.g., predictions of previous tokens) in the predicting streams that are used during parallel processing to predict the remaining tokens of the target sentence.

In aspects, the trained model contains two components: an encoder portion and a decoder portion. The pre-training and fine-tuning processes updates parameters in both the encoder portion and the decoder portion. A structure of the encoder portion does not change during the pre-training and fine-tuning processes but parameters are updated. A structure of the decoder portion generated during the pre-training and fine-tuning processes depends on the target data model that specifies a combination of processing models ranging from the AR to hybrid AR-NAR to NAR models.

In one example, for a target sentence of three words (i.e., three tokens), to generate a trained language model for predicting the first token based on the AR model and the remaining two tokens based on the hybrid AR-NAR model, the fine-tuner 146 selects the main stream, the first predicting stream, and the second predicting stream. In this case, the first token is based on the first token in the main stream. The second token in the first predicting stream references the first token in the main stream. The third token in the second predicting stream references the first token in the main stream and the second token in the first predicting stream.

In another example, for a target sentence of four words (i.e., four tokens), to generate a trained language model for predicting the first two tokens based on the AR model and the remaining two tokens based on the hybrid AR-NAR model, the fine-tuner 146 selects the main stream, the first predicting stream and the second predicting stream. The first token is based on the first token in the main stream. The second token in the first predicting stream references the first token in the main stream. The third token in the first predicting stream references the first and second tokens in the main stream. The fourth token in the second predicting stream references the first and second tokens in the main stream and the third token in the first predicting stream.

In yet another example, all tokens of a target sentence may be processed based on the hybrid AR-NAR model described above. That is, the fine-tuner 146 may select all of the predicting streams but not the main stream for predicting the given number of tokens in the target sentence. However, since the generated prediction streams reference prior token predictions, even though the streams are processed in parallel, accuracy is increased based on the previous context (i.e., prior token predictions) but efficiency is maintained based on the parallel processing.

In aspects, the decoder 143 according to the present embodiment considers one or more (including all) of the different combinations of the previously predicted tokens and Masks (M) as decoder inputs. As noted above, the pre-trainer 144 generates predicting streams that reference (or attend to) predictions for tokens that precede the current token. By considering all the different combinations, the decoder 143 combines the AR language generation model and the NAR language generation model for unified large-scale pre-training. In aspects, the decoder 143 provides pre-training in a highly efficient n-stream manner (e.g., processing multiple predicting streams) with a self-attention mechanism (e.g., the main stream) to model a continuum of all structures of the AR and NAR combined prediction model. The decoder 143 then provides fine-tuning to generate a trained language model that is optimized for the balance between efficiency and accuracy, as required by a particular deployment environment. Thus, the decoder 143 may support prediction processing partially based on the AR language generation model and the remainder based on the hybrid AR-NAR language generation model to balance efficiency and accuracy.

Thus, as discussed above, the pre-trainer 144 uses the main stream to generate a set of predicting streams. The main stream and the set of predicting streams are a superset of streams used for fine-tuning to generate a variety of trained models based on types of a target data model for predicting tokens, from the models more heavily based on an AR model (more accurate) to the models based more heavily on the hybrid AR-NAR model (more efficient). The fine-tuner 146 performs fine-tuning by selecting a subset of streams from the superset of pre-trained streams generated by the pre-trainer 144. The subset of streams is selected based on evaluating the accuracy/efficiency needs of a particular processing scenario to generate a trained model that is customized to meet those needs. That is, it may be determined that a number of tokens should be processed by AR and a remainder of tokens processed by hybrid AR-NAR for a target sentence of a given length. Based on this determination, the fine-tuner 146 may select the subset of streams that are needed to perform token processing accordingly.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
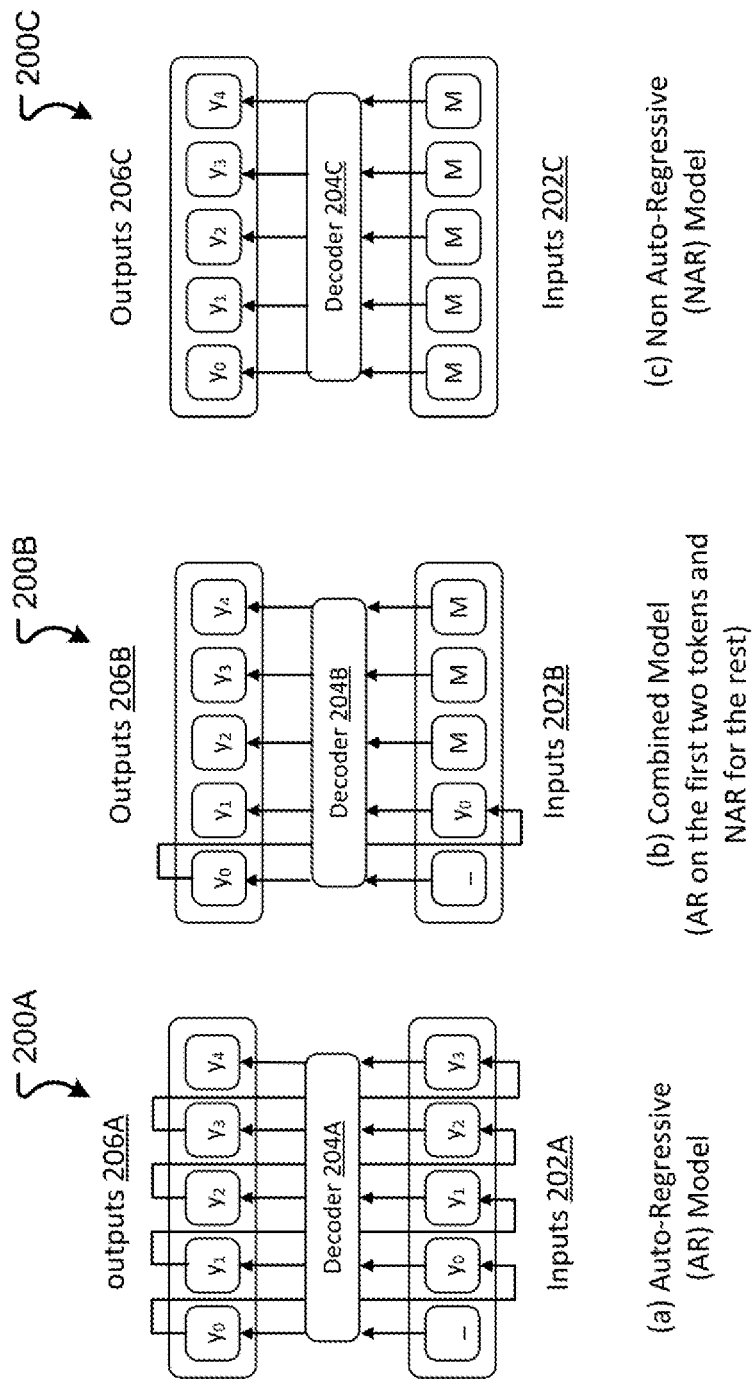
FIG. 2 illustrates an example of system architectures in accordance with aspects of the present disclosure.

FIG. 2 illustrates an example of three distinct types of system architectures of language generation models according to the aspects of the present disclosure. First, the system 200A illustrates a trained model based on the AR model. The system 200A receives inputs 202A, which includes a set of tokens. There are five tokens in the example, the first token being a special "start of sentence" symbol, the second token being y0, the third token y1, the fourth token being y2, and the fifth token being y3. The decoder 204A decodes the input tokens to generate output tokens as outputs 206A. In the AR language generation model, each token attends to its previous token by feeding an output token into the next token as input. In the system 200A, the first output y0 feeds into the second input token to predict y1 as a second output. The second output y1 then feeds into a third input token to predict the third output y2.

In a trained model based on the combined AR/NAR language generation model according to the system 200B, the trained model predicts a number of leading tokens, e.g., the first two tokens, based on the AR model. The combined model uses the NAR model for predicting the rest of the tokens. In aspects, accurately predicting the first few (e.g., the first two) tokens may improve accuracy of predicting the rest of the tokens in a sentence. Using the AR model for the first few words increases accuracy of predicting the tokens (words) while still achieving efficiency by processing the rest of the tokens using the NAR model. In the system 200B, the first predicted token "y0" feeds into the second input token to predict the second token "y1." The prediction of the rest of tokens uses the NAR language generation model using parallel processing by placing masks on the last three input tokens.

The system 200C illustrates a Non-autoregressive (NAR) language generation model. All the five input tokens are masked to predict each token as y0 for the first output token, y1, for the second output token, y2 for the third output token, y3 for the fourth output token, and y4 for the fifth output token. The decoder 204C processes all the five input tokens independently and in parallel to generate predicted tokens. While the trained language model according to the system 200C based on the NAR language generation model provides high efficiency in predicting tokens in parallel, models that are trained based on the NAR language generation model may suffer from poor accuracy because processing the respective tokens is independent and does not attend to the predictions of other tokens when predicting a current token.

Figure 3:
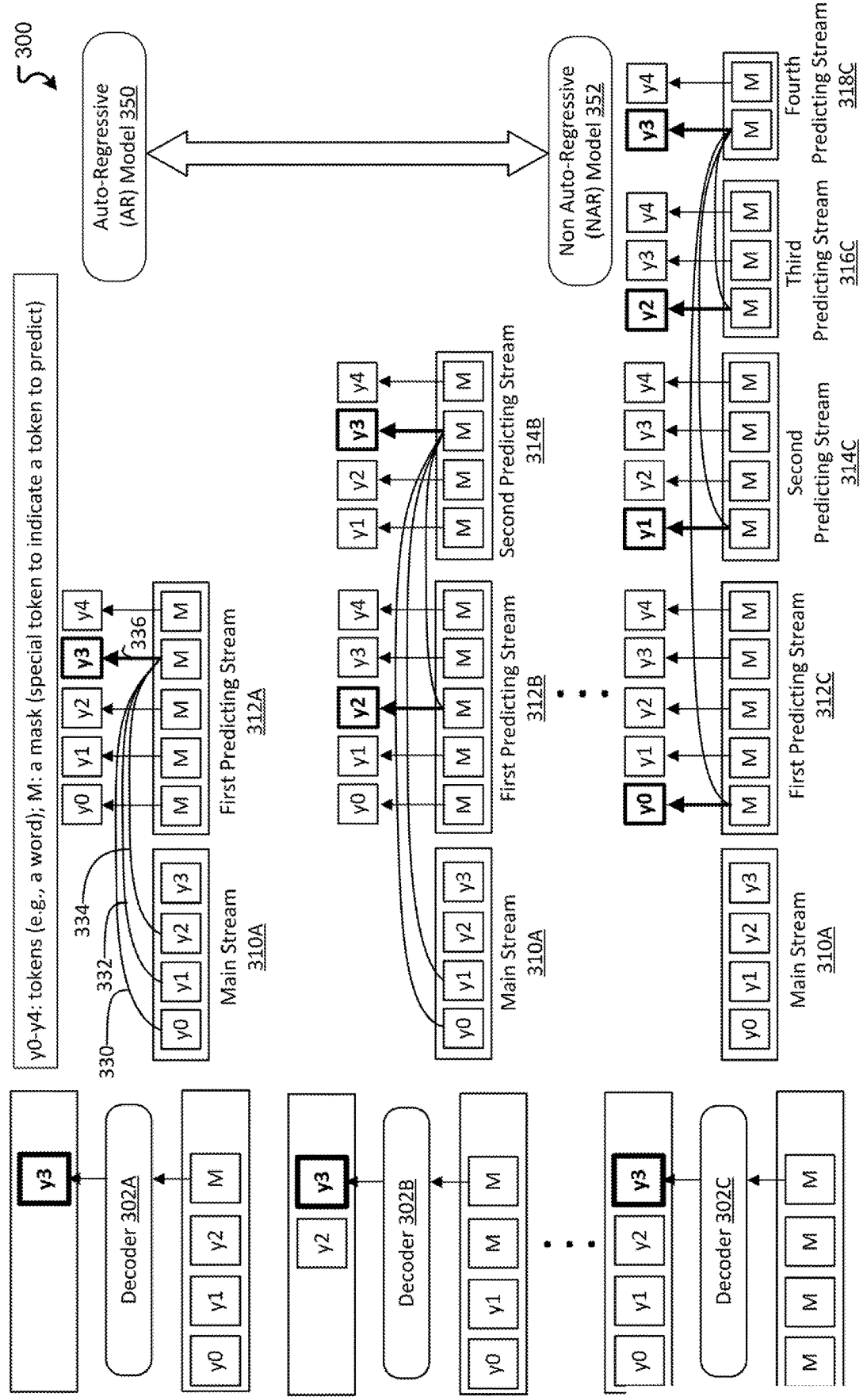
FIG. 3 illustrates an example of pre-trained streams in accordance with aspects of the present disclosure.

FIG. 3 illustrates an example of pre-trained streams and trained models based on the pre-trained streams according to aspects of the present disclosure. The example 300 illustrates three distinct trained language models for predicting a token "y3." In aspects, the pre-trainer generates the main stream 310A and a set of predicting streams 312-318 based on a length of a target sentence. As illustrated, the target sentence comprises at least five tokens or words. For example, the pre-training process generates the main stream 310A, the first predicting stream 312A-C, the second predicting streams 314B-C, the third predicting stream 316C, and the fourth predicting stream 318C.

As illustrated, the decoder 302A represents decoding input tokens (y0, y1, y2, and the Mask symbol "M") based on an input training sentence for training with at least five words to predict a token y3 as an output token. Mask ("M") represents a special token as a mask to indicate a token to predict. In this case, the first predicting stream 312A references output for the first three tokens (e.g., y0, y1, and y2) in the main stream 310A for predicting the fourth token, y3.

In aspects, the pre-training process may include duplicating decoder layers into one main stream and a set of predicting streams with shared parameters. In generating the main stream, tokens are fed into the decoder by correcting predicted tokens with correct answers for the respective tokens. Accordingly, each token in the main stream is corrected if predictions are incorrect. In the predicting streams, a masked token (i.e., mask with "M") attends to one or more tokens in the main stream and preceding generations of predicting streams to predict a value of the masked token. The masked tokens in the first predicting stream 312 A-C constitute trained models based on the AR language generation model.

For example, the pre-trainer may generate predicting streams based on a hybrid AR-NAR model where masked tokens refer to preceding tokens in an AR manner. Unlike typical NAR models that use all possible combinations and connections to other tokens in a target sentence but do not reference prediction values of prior tokens, the technology according to the present disclosure may include a structure where processing a token attends to (or references) token predictions for preceding tokens in the sentence without attending to subsequent tokens.

In the first example, the first predicting stream 312A illustrates predicting token y3 (e.g., the fourth word). All the five tokens are masked, indicating that the prediction operation for all tokens are performed in parallel in an NAR manner. However, each token attends to tokens preceding the token in the main stream 310A, which is similar to the AR manner. For instance, the fourth token from the left in the first prediction stream 312A corresponds to y3, as illustrated by an arrow 336 originating from the masked fourth token to the y3 output token. To predict y3, the fourth token attends to the first token (y0) in the main stream 310A as illustrated by a first reference or attendance link 330. The fourth token further attends to the second token (y1) in the main stream 310A as illustrated by a second reference or attendance link 332, and the third token (y2) in the main stream 310A as illustrated by a third reference or attendance link 334. In this case, the fourth token (y3) is predicted by attending to (e.g., referencing) the token outputs for the three preceding tokens y0-y2 (or words of the training sentence). As detailed above, referring or attending to the previous token to predict the token in the current position is similar to an AR language generation model. Even so, during the pre-training, the pre-trainer generates all the tokens in each generation of the predicting streams in parallel in accordance with an NAR language generation model.

In aspects, each predicting stream is associated with a position (i.e., a generation or order) in a sequence of predicting streams. In the third example, the first predicting stream 312C precedes the second predicting stream 314C, which precedes the third predicting stream 316C, which precedes the fourth predicting stream 318C, for example. The four generations of the predicting streams may be generated with a single path of processing without recurring operations. Thus, predicting streams at the same position in the sequence (e.g., the first predicting stream 312A-C) with respective masked tokens may be generated with concurrent processing. Accordingly, the pre-training process includes one concurrent process to generate all predicting streams.

In the first predicting stream 312A, the masked token y3 attends to the previously predicted tokens (i.e., Gold tokens) y0, y1, and y2 from the main stream 310A to predict a value for the token. For the token y3, the reference or attendance to these tokens provides the lowest difficulty of prediction with increased accuracy associated with an AR model by including all of the previous tokens as the basis for the prediction. Each of the other masked tokens in the first predicting stream 312 are processed similarly as the case for the token y3 and are pre-trained in an AR manner (by looking backward to previous token outputs) and also in an NAR manner (by parallel processing). Here, the first predicting stream 312A-C resembles a structure according to the AR model by referencing or attending to preceding token outputs (e.g., prediction values) in the main stream, but the first predicting stream 312A-C is processed in parallel with all the tokens masked according to the NAR model.

In the second example, the masked token y3 in the second predicting stream 314B refers or attends to the previously predicted tokens y0 and y1 from the main stream 310A and the token y2 from the first predicting stream 312B. The token y2 in the first predicting stream 312B and the token y3 in the second predicting stream 312B use the conditional probability of P(y2, y3|y0, y1). The tokens y2 and y3 generated by the decoder 302B as output in FIG. 3 indicate the combined conditional probability used based on the NAR manner. Because of the shift from using the AR manner for the tokens y0 and y1 followed by the NAR manner to predict the tokens y2 and y3, there is the increased difficulty in accurately predicting the tokens in the second predicting stream 314B.

In the third example, the token y0 in the first predicting stream 312C is predicted without attending to tokens in the main stream in the NAR manner. Here, the masked token y0 is predicted by self-attention. Thus, the token y1 in the second predicting stream 314C is predicted without attending to tokens in the main stream but based on a conditional probability associated with the token y0 in the NAR manner. The token y2 in the third predicting stream 316C is predicted without attending to tokens in the main stream but in the NAR manner, but based on the conditional probability associated with the tokens y0 and y1.

In contrast, in the third example, the token y3 is predicted using the fourth predicting stream 318C with references to the token y0 in the first predicting stream 312C, the token y1 in the second predicting steam 314C, and the token y2 in the third predicting stream 316C. The result of the prediction may not be as accurate as in the case of processing in the pure AR manner, but provides some prior context (prior prediction outputs) and higher efficiency in processing based on the NAR manner. To predict the token y3 based on the fourth predicting stream 318C, only the tokens that were masked and previously predicted in the NAR manner from the previous predicting streams are visible. That is, the first token in each predicting stream composes the NAR prediction in using the fourth predicting stream 318C to predict the token y3. Each masked tokens in the predicting streams is predicted simultaneously for highly efficient processing. Each token in the target sequence of tokens is predicted based on the AR manner by referring (or attending) to preceding tokens in the sentence.

In aspects, the output of the pre-training leverages the unified AR-NAR combined pre-training. By attending to preceding tokens, the unified AR-NAR combined pre-training is consistent with more accurate training based on the AR model. Furthermore, the design of attention among tokens without attending to subsequent tokens prevents bidirectional attention. Accommodating bidirectional attention, which typically includes attending to preceding tokens as well as subsequent tokens, require a number of tokens in a sentence or a length predictor before the decoding can take place. The requirement of length information would make the decoding process unnecessarily processing-intensive. In aspects, only the preceding masked tokens are visible to a token. In yet some other aspects, by eliminating the need to estimate the length information, the decoding in the present disclosure enable processing the first generated "[eos]" token as the signal of sentence end token, which is consistent with the AR models processing of the "[eos]" token.

In aspects, the examples of FIG. 3 illustrate examples of fine tuning. That is, the pre-trainer generates a set of streams including the main stream and the predicting streams as a common basis to accommodate fine-tuning to generate trained models based on a variety of combinations of language generation models. The processing models range from the AR language generation model for accuracy (e.g., the first example), the NAR language generation model for efficiency (e.g., the third example), and combinations thereof that partially use the AR language generation model and the NAR language generation model (e.g., the second example). In effect, the decoder based on the present disclosure acts as a bridge between the AR model and the NAR model.

Once the pre-trainer generates the main stream and the set of predicting streams in the pre-training process, then the fine-tuner selects a subset of the generated streams to generate a trained language generation model in the fine-tuning process. In aspects, fine-tuning may receive an input (e.g., from a developer) that specifies a type or types of trained language models (e.g., target models and target data models) for generating the trained model, e.g., using the AR model for processing a number of tokens and using the NAR model for processing the remainder of the tokens of a target sentence in accordance with an accuracy constraint and an efficiency constraint during deployment. Determining the target data model may be based on balancing the accuracy constraint and/or the efficient constraint for predicting tokens.

As discussed above, the fine-tuner generates trained models to address a particular processing scenario. For instance, available resources (e.g., memory and processing availability), accuracy requirements, efficiency requirements, and the like, may be evaluated to identify an optimal trained model for a particular situation. For instance, if processing availability is low, an optimal trained model may rely less on an AR model and more on an NAR model. Alternatively, if accuracy is important, an optimal trained model may rely more on an AR model and less on an NAR model. An optimal trained model for generating accurate predictions without substantial latency may involve a combination of the AR and NAR models, such as predicting the first token using the AR model and predicting the remaining tokens using NAR, for example. Upon determining a structure for an optimal model (e.g., AR for first token, NAR for remaining tokens), a subset of streams for generating the trained model may be selected from the superset of streams generated during pre-processing.

In the second example of FIG. 3, the fine-tuning generates the trained model based on a combination between the AR/NAR models includes selecting the main stream and two or more predicting streams. In the case of predicting the token y3 based on the first two token in the AR manner and the rest in the NAR manner, the fine-tuner selects the main stream 310A, the first predicting stream 312B, and the second predicting stream 314B. The token y3 in the second predicting stream 314B attends to the first token y0 and the second token y1 in the mains stream 310A while attending to the third token y2 in the first predicting stream 312B. Accordingly, the combined language generation model uses the AR language generation model for the first two tokens (words) for high accuracy while using the NAR language generation model for the "y2" and "y3" for high efficiency.

In the third example of FIG. 3, fine-tuning is used to generate trained models based on the NAR language generation model 352. Here, the fine-tuner selects the first predicting stream 312 A-C, the second predicting streams 314 B-C, the third predicting streams 316C, and the fourth predicting streams 318C. That is, the fine-tuner selects all the predicting streams but not the main streams to generate the structure of the trained model based on the NAR model. For example, to predict the token "y3," the token for "y3" attends to the first token of each of the previous predicting streams: "y0" in the first predicting stream 312C, "y1" in the second predicting stream 314C, "y2" in the third predicting stream 316C. In aspects, the fine-tuner for the NAR language generation model performs predictions of all of the masked tokens in a predicting stream in a concurrent manner. The concurrent processing makes the fine-tuning for generating the NAR language generation model highly efficient.

Figure 4:
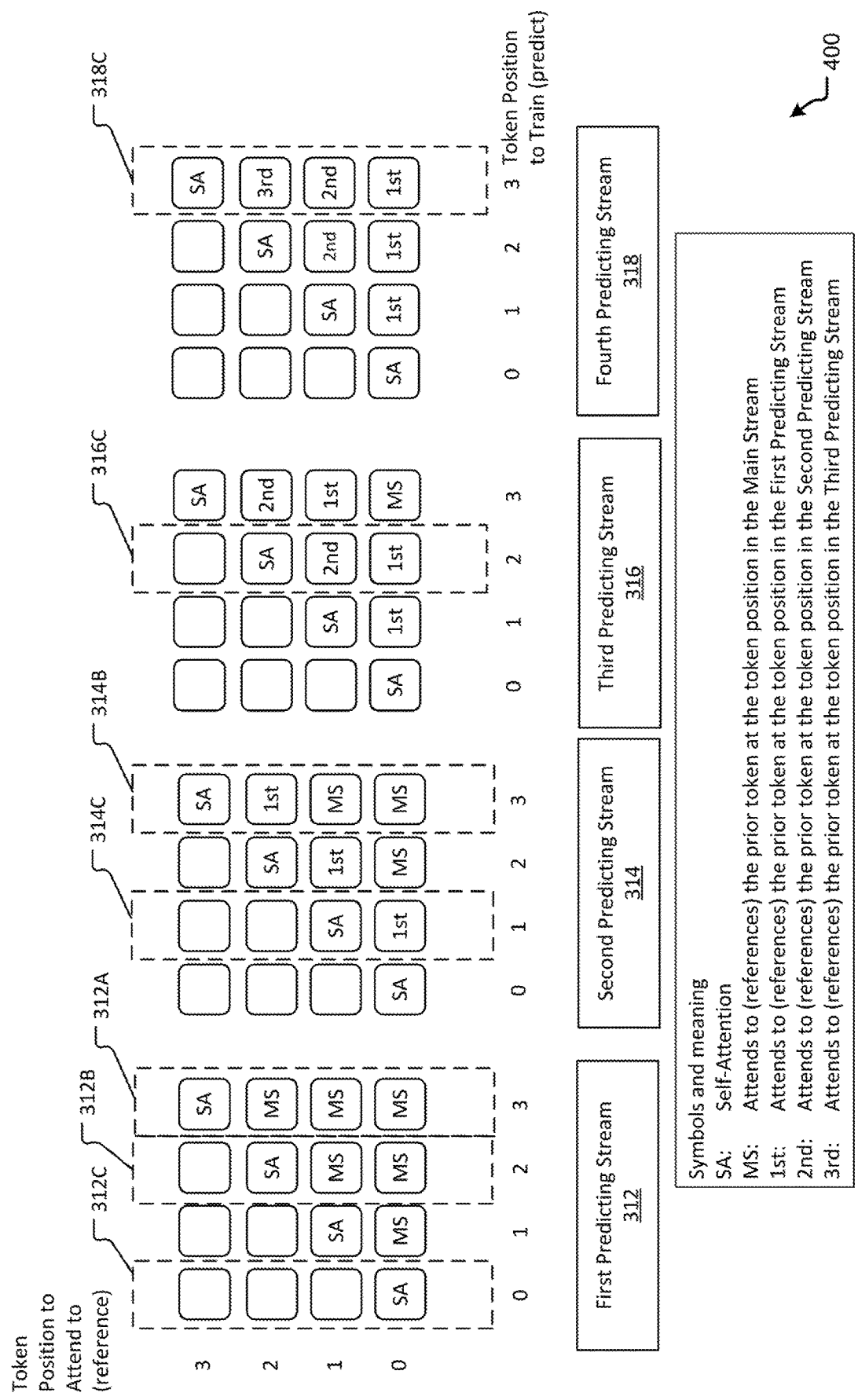
FIG. 4 illustrates an example of data structures of pre-dicting streams during pre-training in accordance with aspects of the present disclosure.

FIG. 4 illustrates a schematic example of generating predicting streams during the pre-training process in accordance with the aspects of the present disclosure. FIG. 4 illustrates four predicting streams: the first predicting stream 312, the second predicting stream 314, the third predicting stream 316, and the fourth predicting stream 318. The illustrations of cells above the respective labels of predicting streams describe which positions of tokens are attended (referenced) for predicting respective tokens. The horizontal numbers indicate token positions to train (predict). The vertical numbers indicate prior token positions to attend to (reference) in predicting the token at the current position.

In respective cells, "SA" indicates self-attention. "MS" indicate attending to (referencing) the token at the position in the Main Stream. "1st" indicates attending to (referencing) the token at the position in the first predicting stream. "2nd" indicates attending to (referencing) the token at the position in the second predicting stream. "3rd" indicates attending to (referencing) the token at the position in the third predicting stream. An empty cell indicates there is no attention from the token to a corresponding token in the main stream or a predicting stream.

As illustrated by FIG. 3, using the first predicting stream 312, the first token at token position (0) is predicted based on self-attention without referring to any other token to output the token value "y0," as illustrated by the first predicting stream process 312C in FIG. 3. The second token at token position (1) is predicted based on self-attention and attends to (i.e., references) the first token (0) in the main stream to output token value "y1." The third token at token position (2) is predicted based on self-attention and attends to the first token (0) and the second token (1) in the main stream, as illustrated by the first predicting stream process 312B in FIG. 3. The fourth token at token position (3) is predicted based on self-attention and attends to the first, second, and third tokens in the main stream, as illustrated by the first predicting stream process 312A in FIG. 3.

Using the second predicting stream 314, the first token at token position (0) is predicted based on self-attention. The second token at token position (1) is predicted based on self-attention and attends to the first token (0) in the first predicting stream, as illustrated by the second predicting stream process 314C in FIG. 3. The third token at token position (2) is predicted based on self-attention and attends to the first token (0) in the main stream and the second token (1) in the first predicting stream. The fourth token at token position (3) is predicted based on self-attention and attends to the first token (0) and the second token (1) in the main stream, and attends to the third token (2) in the first predicting stream, as illustrated by the second predicting stream process 314B in FIG. 3.

Using the third predicting stream 316, the first token at token position (0) is predicted based on self-attention. The second token at token position (1) is predicted based on self-attention and attends to the first token (0) in the first predicting stream. The third token at token position (2) is predicted based on self-attention and attends to the first token (0) in the first predicting stream and the second token (1) in the second predicting stream, as illustrated by the third predicting stream process 316C in FIG. 3. The fourth token at token position (3) is predicted based on self-attention and attends to the first token (0) in the main stream, the second token (1) in the first predicting stream, and the third token (2) in the second predicting stream.

In the fourth predicting stream 318, the first token at token position (0) is predicted based on self-attention. The second token at token position (1) is predicted based on self-attention and attends to the first token (0) in the first predicting stream. The third token at token position (2) is predicted based on self-attention and attends to the first token (0) in the first predicting stream and the second token (1) in the second predicting stream. The fourth token at token position (3) is predicted based on self-attention and attends to the first token (0) in the first predicting stream, the second token (1) in the second predicting stream, and the third token (2) in the third predicting stream, as illustrated by fourth predicting stream process 318C in FIG. 3.

In aspects, the pre-training includes generating one main stream and a set of predicting streams. In the i-th predicting stream, tokens are predicted as i-th subsequent tokens from the previously predicted token. Each token in the first predicting stream 312A-C is predicted in the autoregressive (AR) pattern. That is, a masked token of each of the tokens in the first predicting stream 312A-C attends to its previously predicted tokens from the main stream.

Figure 5A:
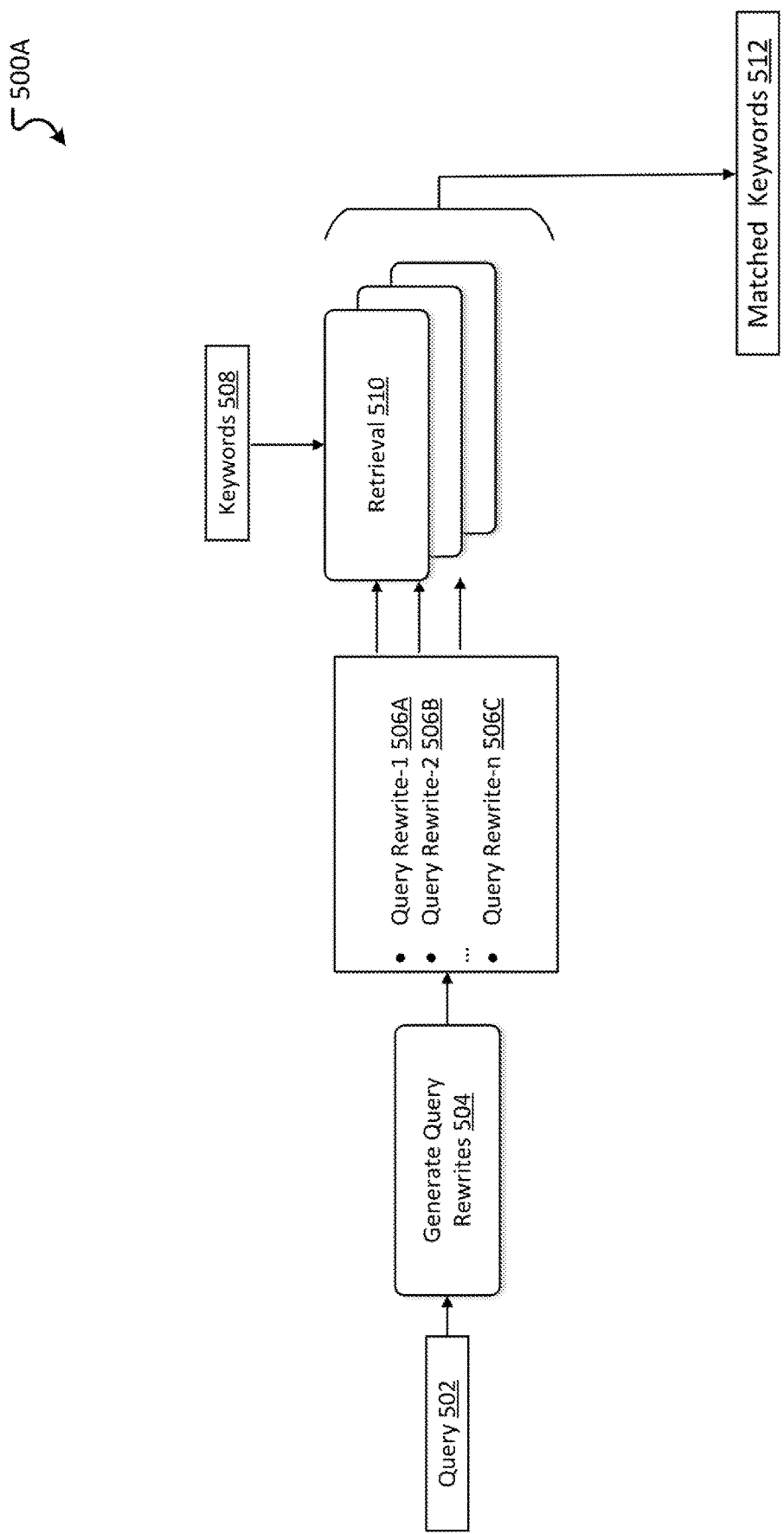
FIG. 5A illustrates an example of determining matched keywords by generating queries based on a received query using a trained model in accordance with aspects of the present disclosure.

FIG. 5A illustrates an example keyword matching process by having deployed a trained language generation model in a content search engine. The process receives a query 502 for a search for information with keywords. Generation step 504 generates a set of queries based on the received query, by using the trained language generation model. The set of queries are indicated by Query Rewrite-1 506A, Query Rewrite-2 506B, Query Rewrite-3 506C, and so on. The retrieval operation 510 retrieves results based on the set of queries. The results are then matched against a set of known keywords 508. In aspects, the trained language generation model is based on the hybrid AR-NAR model, similar to the third example in FIG. 3. The trained language generation model uses the received query 502 to generate new queries that similar in context using a set of predicting streams that are fined-tuned to predict in the NAR manner. The trained language model generates queries that are within the acceptable range of accuracy in a highly efficient manner for use in the real-time processing by the content search engine.

Figure 5B:
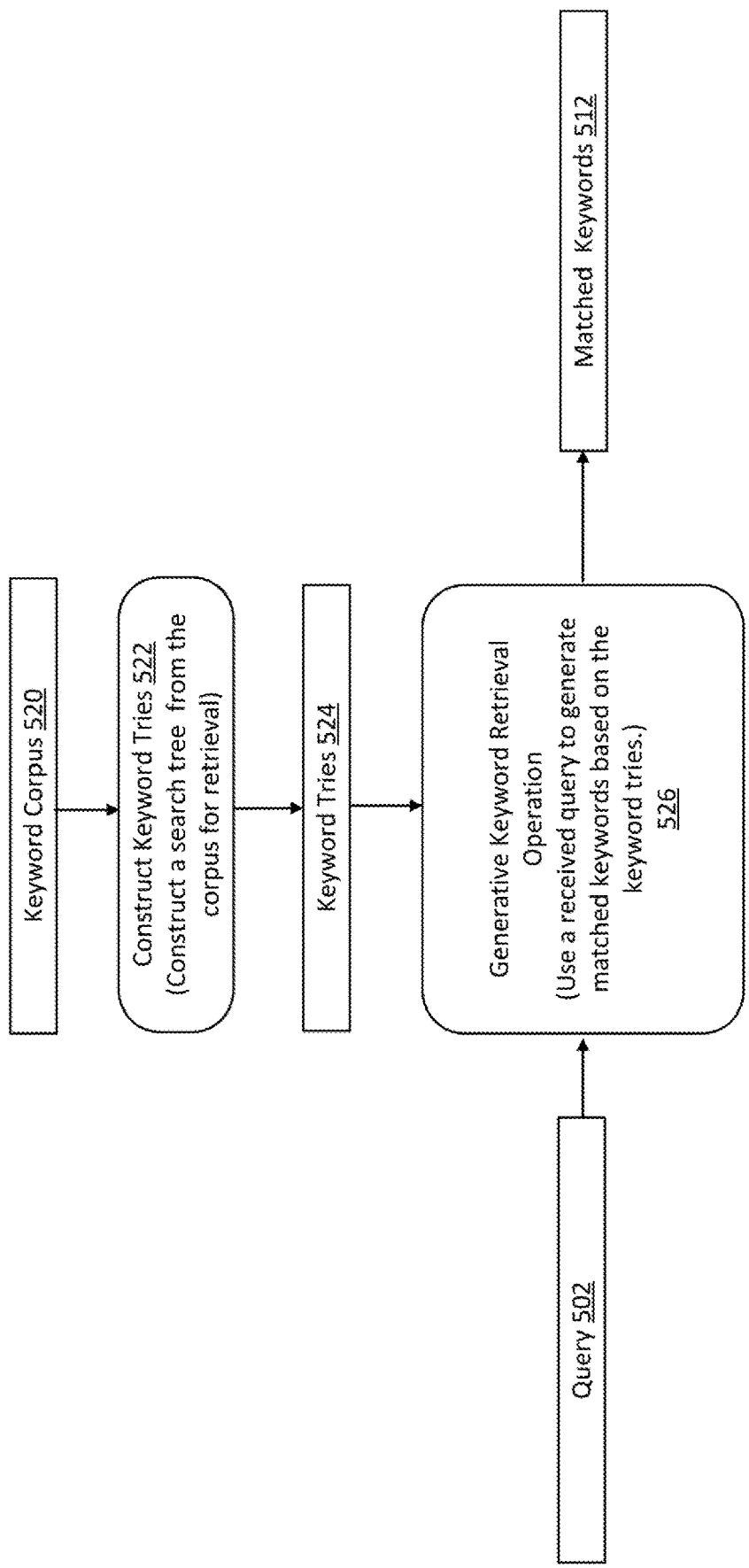
FIG. 5B illustrates an example of determining matched keywords based on generative retrieval using a trained model in accordance with aspects of the present disclosure.

FIG. 5B illustrates an example of a system of components for generating matched keywords according to the aspects of the present disclosure. The rectangular boxes represent data. The oval boxes represent operations. A query 502 is received and the generative keyword retrieval operation 526 step uses keyword Tries 524 (i.e., a search tree graph for retrieving keywords) to generate a set of matched keywords. A Trie, also known as a prefix tree, is a tree-like data structure having nodes that store each keyword in a library. The keyword Tries 524 may be generated by the Trie construction step 522, which uses a keyword corpus 520.

Figure 6:
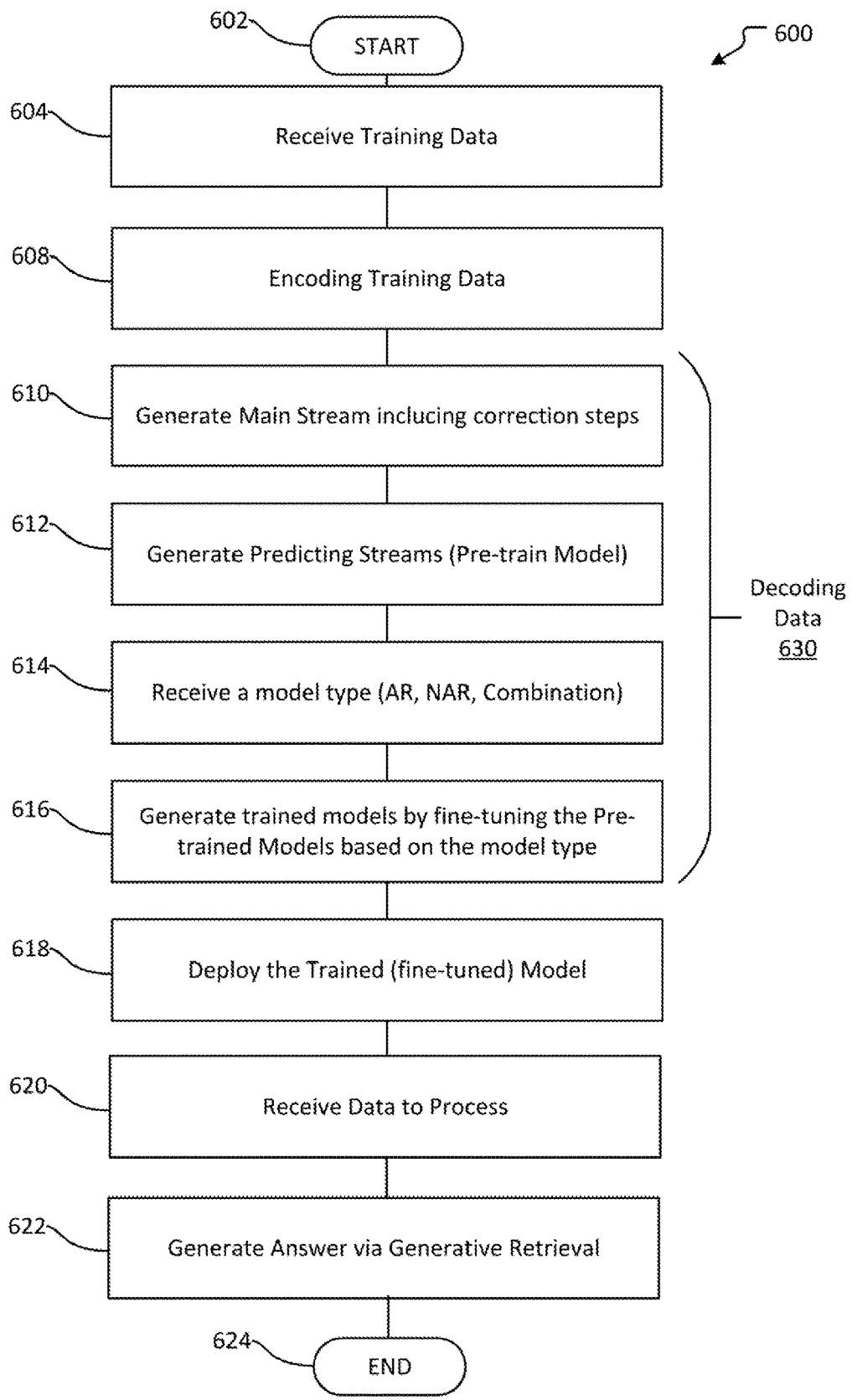
FIG. 6 illustrates an example of a method for generating and using a trained model in accordance with aspects of the present disclosure.

FIG. 6 is an example of a method for generating and using trained language generation models in accordance with aspects of the present disclosure. A general order of the operations for the method 600 is shown in FIG. 6. Generally, the method 600 begins with start operation 602 and ends with end operation 624. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5A, 5B, 7, and 8A-B.

Following start operation 602, the method 600 begins with receive operation 604, which receives training data. The developer may specify the type of training data, which may include a set of sentences for training a language generation model. Encoding operation 608 encodes the training data into a set of vectors. For example, in natural language processing, each word of a sentence may correspond to a token that is represented by one or more vectors.

Generate operation 610 generates a main stream. The main stream may be a series of tokens, each representing a word of a sentence in an encoded form. Generating the main stream may be trained with steps of comparing a prediction answer with a correct answer, correcting the prediction answer with the correct answer if the prediction answer is incorrect, and using the correct answer for predicting subsequent tokens or words in a sentence (e.g., teacher-forcing). In aspects, the generate operation 610 is a part of a pre-training process.

Generate operation 612 generates a set of predicting streams. In aspects, the generate operation 612 may generate the set of predicting streams based on concurrent processing, as illustrated in FIG. 4. The generate operation 612 may be a part of a pre-training process. For each prediction stream, predicting one or more tokens may attend to (or reference) one or more preceding token values (or outputs) in preceding predicting streams or the main stream. In aspects, unlike generating models based on a traditional NAR language model, the generate operation 612 may exclude attending to connections with subsequent tokens but may attend to preceding tokens to the current token. That is, while the generated predicting streams with masked tokens for parallel processing may be similar in efficiency to NAR models, processing tokens by attending to preceding tokens reflects characteristics of AR models that improve accuracy.

Receive operation 614 receives a model type of a target language generation model. Types of the target or trained language generation model may be selected based on balancing resource availability, efficiency requirements, accuracy requirement, and the like. Types of trained models may rely more heavily on the AR model for accuracy or the NAR model for efficiency. For instance, a trained model may specify a varying number of tokens (e.g., first token, first two tokens) to be predicted based on the more accurate AR model, while the remainder of the tokens to be predicted based on the more efficient NAR model. In some aspects, a type of data being used for prediction may determine the model type. For example, types of data may include text sentences and image pixel data. In some other aspects, the model type may also be based on an efficiency requirement, such as a maximum time allowed for predicting data.

Generate operation 616 generates a trained language model by fine-tuning the pre-trained model (e.g., predicted streams generated at generate operation 612) based on the type of trained language model received at receive operation 614. The fine-tuning step selects a specific set of streams to generate a trained language generation mode according to the received type. In this way, a trained model or a trained data model can be customized for a particular processing environment based on balancing efficiency and accuracy, for example. Upon completing the generate operation 616, the fine-tuned model is a trained model for deployment for use.

Deploy operation 618 deploys the trained (fine-tuned) language model to a commercial or production system environment for use. In aspects, the trained model may be deployed for use in a data search and keyword search server, for example. The trained model may automatically generate queries that are similar to a given query. In aspects, Distinct fine-tuners may be used to fine-tune the same pre-trained model to generate a set of trained models, where each trained model is fine-tuned for distinct types of target data models, using the AR model, the NAR model, and one or more combinations of the AR model and the NAR model as a processing model. Each trained model in the set of trained models may provide a distinct balance or tradeoff between efficiency constraint and accuracy constraint in data processing. In some other aspects, each trained model may be deployed to a deployment environment that matches these tradeoff requirements of efficiency and accuracy. A trained data model that is fine-tuned based on the AR model may be deployed to an environment where accuracy of predicting data is priority over efficiency of predicting data. Another trained data model that is fine-tuned based on the NAR model may be deployed to another environment that has strict requirements on efficiency or processing time of predicting data, such as a large-scale web search engine. This way, the present disclosure provides pre-training that generates a superset of data (e.g., the generated prediction streams), which can be fine-tune to generate data models customized to satisfy requirements in a particular deployment environment.

The retrieve operation 620 retrieves data for processing. In aspects, the trained model generated at generate operation 616 is used for information retrieval, e.g., generative keyword retrieval. The trained model based on the combined AR/NAR model, for example, may generate a set of queries based on a given query to enhance search results by retrieving information based on the set of the queries in addition to the given query. In a system environment where high efficiency is required over accuracy, a trained language generation model that is fined-tuned to predict more tokens in the hybrid AR-NAR model may be appropriate. Keyword matching may be performed on the retrieved data and matched keyword may be provided as a result.

The generate operation 622 may generate an answer (or results) to a given query based on the generative retrieval. In aspects, the trained language generation model may be used to supplement an existing query-keyword matching algorithm using the sequence-to-sequence model. In aspects, method 600 may end with end operation 624.

As should be appreciated, operations 602-624 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
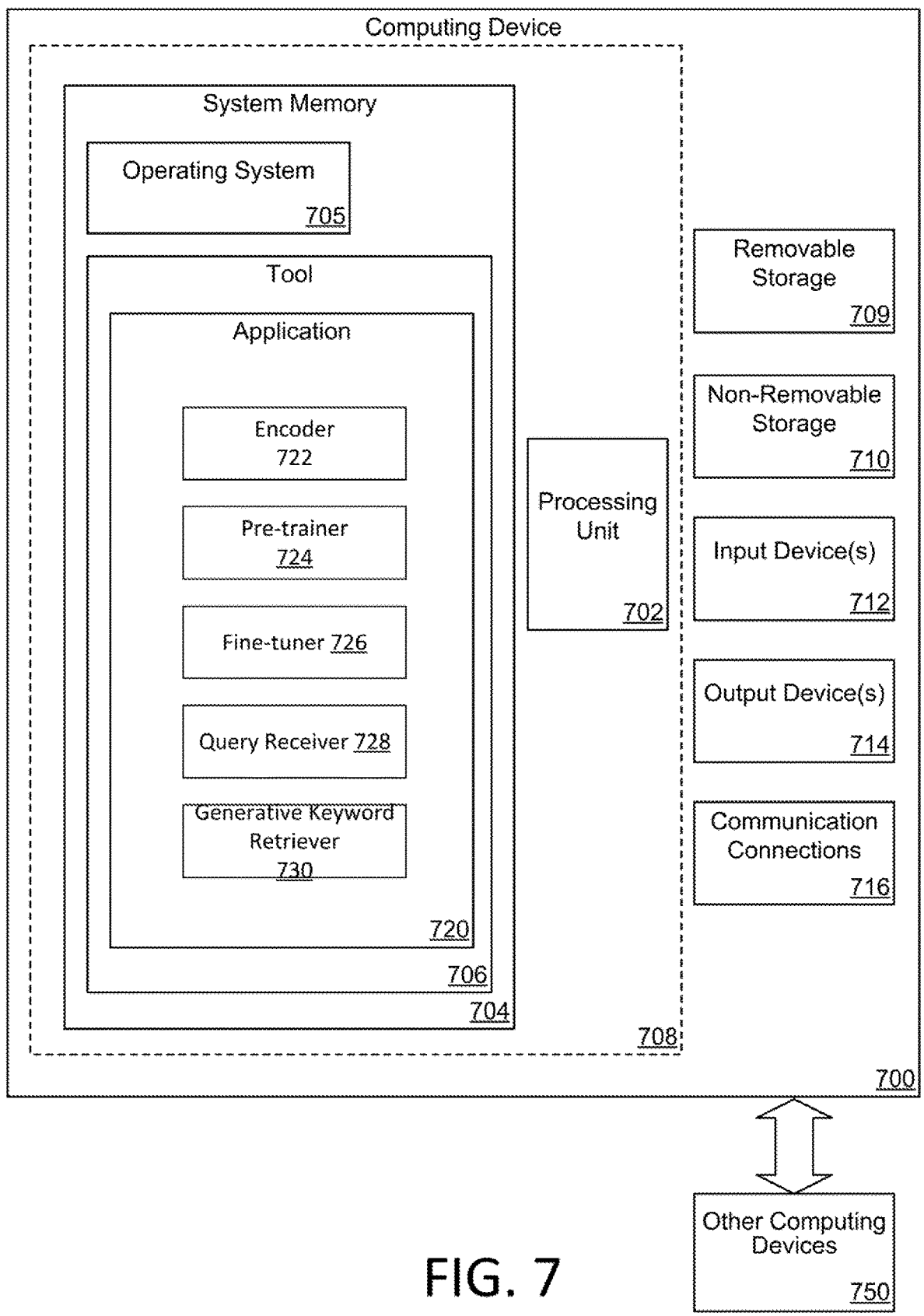
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes an encoder 722, a pre-trainer 724, a fine-tuner 726, a query receiver 728, and a generative keyword retriever 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
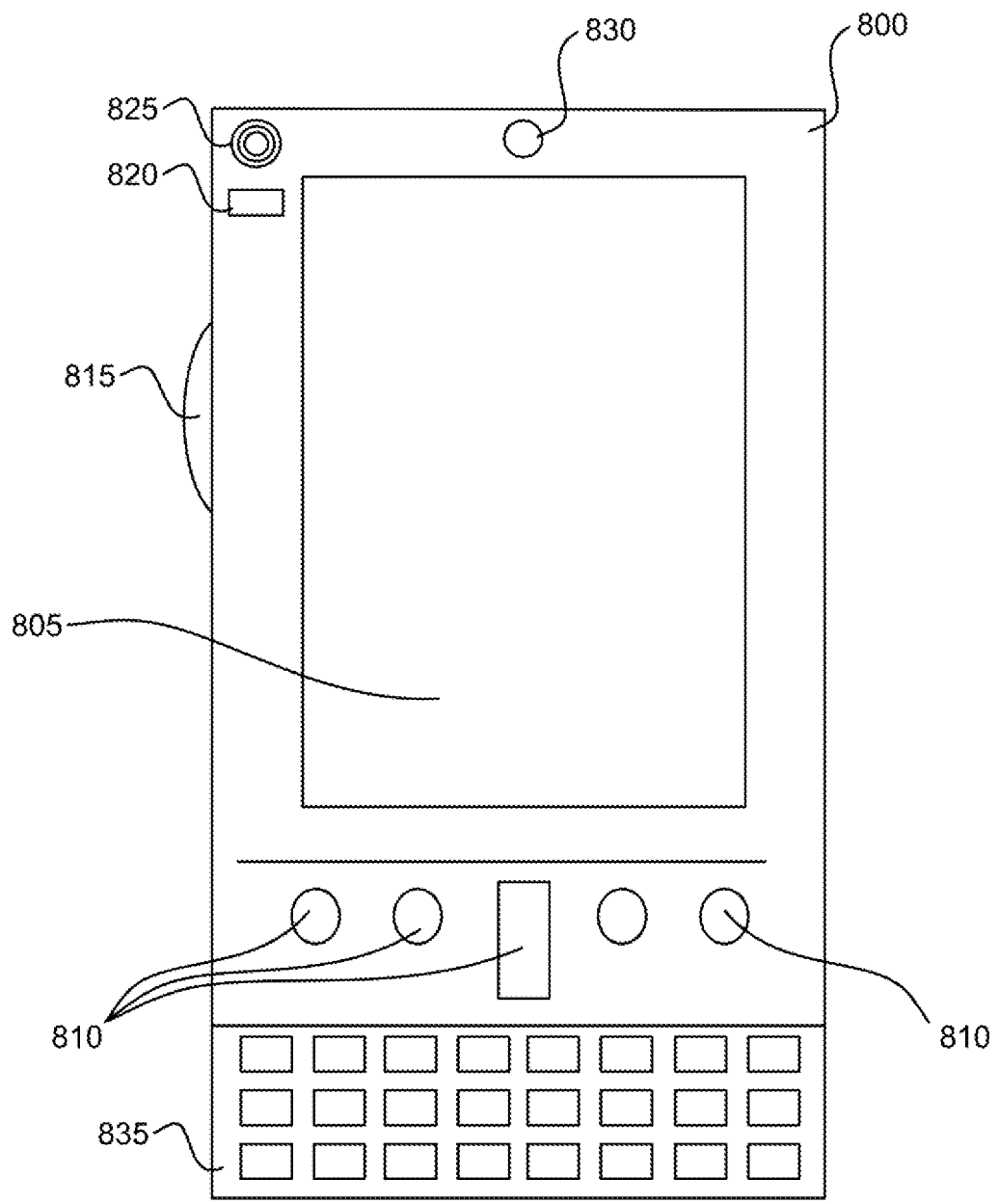
FIG. 8A is a simplified diagram of a mobile computing device with which aspects of the present disclosure may be practiced.
Figure 8B:
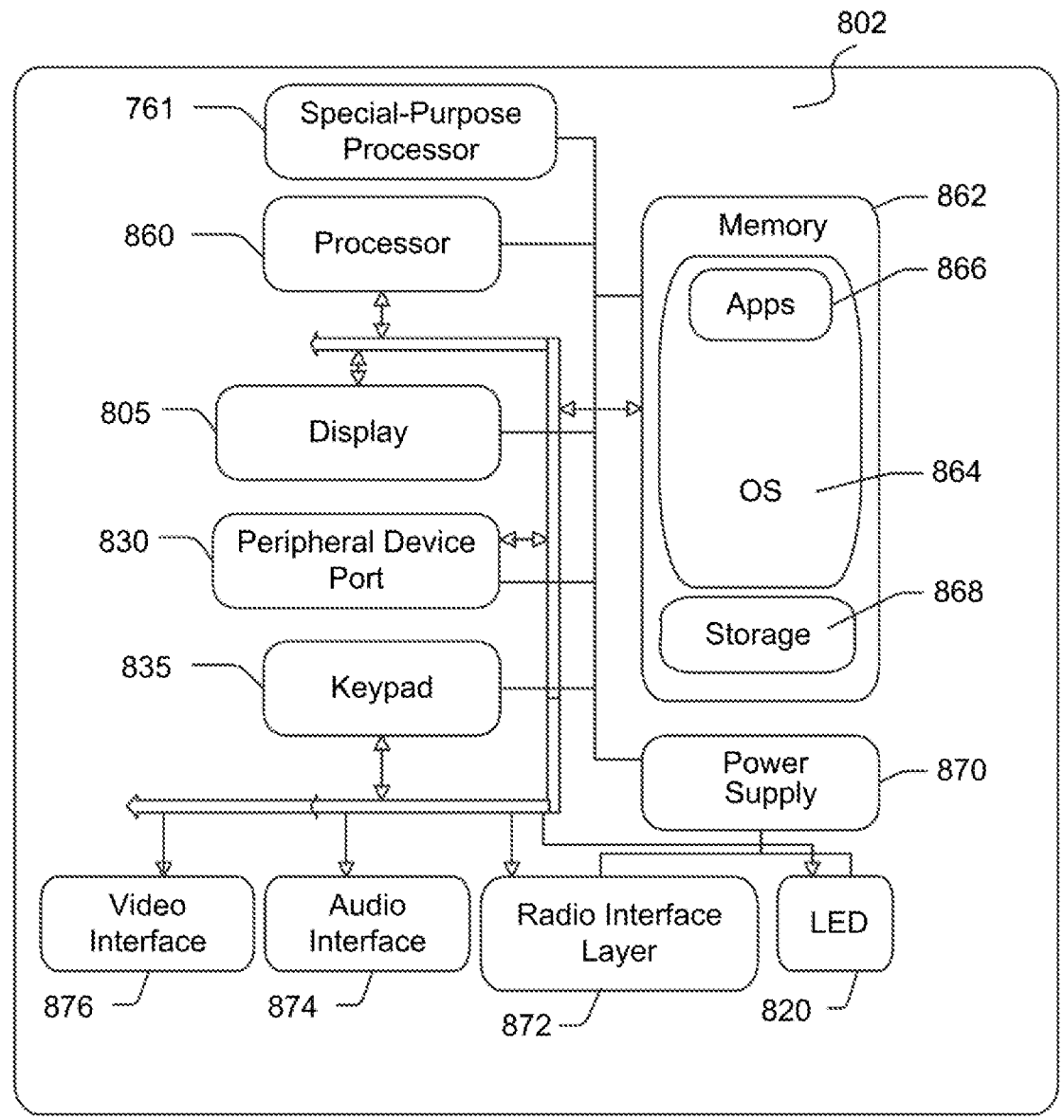
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device A 102A and user of client device B 102B in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 110 and a data model generator 140 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for generating a keyword sequence from an input query according to at least the examples provided in the sections below:

(A1) In one aspect, some embodiments include a method (e.g., 600) of generating a language generation model from receiving training data (e.g., 148); receiving training data (e.g., 148); generating, based on the training data (e.g., 148), a main stream (e.g., 310A), wherein the main stream represents a stream of tokens, and wherein each token represents a value associated with the training data (e.g., 148); generating, a series of predicting streams (e.g., 312A-C, 314B-C, 316C, and 318C) based on the main stream (e.g., 310A), wherein each predicting stream includes one or more masked tokens corresponding to one or more token positions in the stream of tokens; based on a target data model (e.g., 350 and 352), selecting a first set of streams (e.g., 310A) for predicting tokens according to a first processing model (e.g., 350), wherein the first set of streams is selected from the main stream (e.g., 310A) and the series of predicting streams (e.g., 312A-C, 314B-C, 316C, and 318C); based on the target data model (e.g., 350 and 352), selecting a second set of streams (e.g., 312, 314, 316, and 318) for predicting tokens according to a second processing model (e.g., 352), wherein the second set of streams is selected from the series of predicting streams; and generating, using the selected first set of streams and second set of streams, a trained data model (e.g., a combination of 310A, 312B, and 314B) corresponding to the target data model for predicting tokens in accordance with an accuracy constraint and an efficiency constraint during deployment.

(A2) In some embodiments of A1, the first processing model (e.g., 350) is associated with an autoregressive (AR) model (e.g., 200A), and wherein the second processing model (e.g., 352) is associated with a non-autoregressive (NAR) model (e.g., 200C).

(A3) In some embodiments of A1, the target data model (e.g., 350 and 352) specifies a number of tokens to be processed based on the first processing model (e.g., 350) and remaining tokens to be processed based on the second processing model (e.g., 352).

(A4) In some embodiments of A1, a second stream of the second set of streams references a predicted value of a token in a first stream of the second set of streams.

(A5) In some embodiments of A4, the second set of streams is processed in parallel according to the second processing model.

(A6) In some embodiments of A1, a second stream of the first set of streams references a value of a token in a first stream of the first set of streams.

(A7) Some embodiments of A1 further include determining the target data model based on balancing the accuracy constraint and the efficiency constraint for predicting tokens.

(A8) In some embodiments of A1, the first stream is the main stream.

(A9) Some embodiments of A1 further include receiving a query, generating, based on the received query, a set of queries using the trained data model, retrieving, based on the set of queries, one or more keywords, generating a set of keywords by matching the one or more keywords with at least one known keyword in a keyword corpus, and transmitting the set of generated keywords.

Any of the one or more above aspects in combination with any other of the one or more aspect. Any of the one or more aspects as described herein.

What is claimed is:

1. A computer-implemented method of training a data model, the method comprising:
   receiving training data;
   generating, based on the training data, a main stream of tokens, each token representing a value associated with the training data;
   generating, using a self-attention mechanism, a series of predicting streams based on the main stream, each predicting stream having one or more masked tokens corresponding to one or more token positions in the predicting stream, the self-attention mechanism comprising:
processing each masked token in the predicting streams in parallel; and
for each token in a target sequence of tokens, predicting that token based on self-attention for a first token and, for subsequent tokens, based on at least one preceding token in the target sequence;
based at least on a target data model, determining a first set of streams for predicting tokens according to a first processing model, the first set of streams selected from the main stream and the series of predicting streams;
based at least on the target data model, determining a second set of streams for predicting tokens according to a second processing model, the second set of streams selected from the series of predicting streams; and
generating, using the determined first set of streams and second set of streams, a trained data model corresponding to the target data model for predicting tokens in accordance with an accuracy constraint and an efficiency constraint during deployment.

2. The method of claim 1, wherein the first processing model is associated with an autoregressive (AR) model, and wherein the second processing model is associated with a non-autoregressive (NAR) model.

3. The method of claim 1, wherein the target data model specifies a number of tokens to be processed based on the first processing model and remaining number of tokens to be processed based on the second processing model.

4. The method of claim 1, wherein a second stream of the second set of streams references a predicted value of a token in a first stream of the second set of streams.

5. The method of claim 4, wherein the second set of streams is processed in parallel according to the second processing model.

6. The method of claim 1, wherein a second stream of the first set of streams references a value of a token in a first stream of the first set of streams, and wherein the first stream is the main stream.

7. The method of claim 1, the method further comprising:
receiving a query;
generating, based on the received query, a set of queries using the trained data model;
retrieving, based on the set of queries, one or more keywords;
generating a set of keywords by matching the one or more keywords with at least one known keyword in a keyword corpus; and
transmitting the set of generated keywords.

8. The method of claim 1, the method further comprising:
determining the target data model based on balancing an accuracy constraint and an efficiency constraint for predicting tokens.

9. The method of claim 1, wherein each token in the target sequence of tokens is predicted without attending to the subsequent tokens.

10. The method of claim 1, wherein the first and second sets of streams are further determined based on the accuracy constraint and the efficiency constraint.

11. A system for training a data model, the system comprises:
a processor; and
a memory storing computer-executable instructions that when executed by the processor cause the system to:
receive training data;
generate, based on the training data, a main stream, wherein the main stream represents a stream of tokens, and wherein each token represents a value associated with the training data;
generate, using a self-attention mechanism, a series of predicting streams based on the main stream, each predicting stream having one or more masked tokens corresponding to one or more token positions in the predicting stream, the self-attention mechanism comprising:
processing each masked token in the predicting streams in parallel; and
for each token in a target sequence of tokens, predicting that token based on self-attention for a first token and, for subsequent tokens, based on at least one preceding token in the target sequence;
based at least on a target data model, determine a first set of streams for predicting tokens according to a first processing model, the first set of streams being selected from the main stream and the series of predicting streams;
based at least on the target data model, determine a second set of streams for predicting tokens according to a second processing model, the second set of streams being selected from the series of predicting streams; and
generate, using the determined first set of streams and second set of streams, a trained data model corresponding to the target data model for predicting tokens in accordance with an accuracy constraint and an efficiency constraint during deployment.

12. The system of claim 11, wherein the first processing model is associated with an autoregressive (AR) model, and wherein the second processing model is associated with a non-autoregressive (NAR) model.

13. The system of claim 11, wherein the target data model specifies a number of tokens to be processed based on the first processing model and remaining tokens to be processed based on the second processing model.

14. The system of claim 11, wherein a second stream of the second set of streams references a predicted value of a token in a first stream of the second set of streams, and wherein the second set of streams is processed in parallel according to the second processing model.

15. The system of claim 11, wherein a second stream of the first set of streams references a value of a token in a first stream of the first set of streams, and wherein the first stream is the main stream.

16. The system of claim 11, the computer-executable instructions when executed further causing the system to:
determine the target data model based on balancing an accuracy constraint and an efficiency constraint for predicting tokens.

17. The system of claim 11, wherein each token in the target sequence of tokens is predicted without attending to the subsequent tokens.

18. The system of claim 11, wherein the first and second sets of streams are further determined based on the accuracy constraint and the efficiency constraint.

19. The system of claim 11, wherein the system is further caused to:
receive a query;
generate, based on the received query, a set of queries using the trained data model;
retrieve, based on the set of queries, one or more keywords;

generate a set of keywords by matching the one or more keywords with at least one known keyword in a keyword corpus; and transmit the set of generated keywords.

20. A computer-readable non-transitory recording medium storing computer-executable instructions that when executed by a processor cause a computer system to:

receive training data;

generate, based on the training data, a main stream tokens, each token representing a value associated with the training data;

generate, a series of predicting streams based on the main stream, each predicting stream having one or more masked tokens corresponding to one or more token positions in the stream of tokens;

based at least on a target data model, determine a first set of streams for predicting tokens according to a first processing model, the first set of streams selected from the main stream and the series of predicting streams;

based at least on the target data model, determine a second set of streams for predicting tokens according to a second processing model, the second set of streams selected from the series of predicting streams;

generate, using the determined first set of streams and second set of streams, a trained data model corresponding to the target data model for predicting tokens in accordance with an accuracy constraint and an efficiency constraint during deployment;

receive a query;

generate, based on the received query, a set of queries using the trained data model;

retrieve, based on the set of queries, one or more keywords;

generate a set of keywords by matching the one or more keywords with at least one known keyword in a keyword corpus; and transmit the set of generated keywords.

* * * * *